United States Patent
Roychoudhury

(10) Patent No.: US 10,131,283 B2
(45) Date of Patent: Nov. 20, 2018

(54) GLOVE BOX BIN BUMPER STOPS

(71) Applicant: FORD GLOBAL TECHNOLOGIES, LLC, Dearborn, MI (US)

(72) Inventor: Raj S. Roychoudhury, Bloomfield Hills, MI (US)

(*) Notice: Subject to any disclaimer, the term of this patent is extended or adjusted under 35 U.S.C. 154(b) by 88 days.

(21) Appl. No.: 15/276,865

(22) Filed: Sep. 27, 2016

(65) Prior Publication Data
US 2018/0086274 A1    Mar. 29, 2018

(51) Int. Cl.
*B60R 7/06*      (2006.01)

(52) U.S. Cl.
CPC ..................... *B60R 7/06* (2013.01)

(58) Field of Classification Search
CPC .................... B60R 7/04; B60R 7/06
USPC ........................................... 296/37.12
See application file for complete search history.

(56) References Cited

U.S. PATENT DOCUMENTS

| | | | | |
|---|---|---|---|---|
| 5,845,954 A * | 12/1998 | DePue | ...................... | B60R 7/06 16/82 |
| 5,951,083 A * | 9/1999 | Bittinger | .................. | B60N 3/12 16/339 |
| 6,076,878 A * | 6/2000 | Isano | ........................ | B60R 7/06 16/82 |
| 7,422,261 B2 | 9/2008 | Zellner, Jr. et al. | | |
| 7,431,369 B2 | 10/2008 | Park | | |
| 9,637,061 B2 * | 5/2017 | Mazzocchi | ............... | B60R 7/06 |
| 2005/0082864 A1 * | 4/2005 | Park | .......................... | B60R 7/06 296/37.12 |
| 2005/0283943 A1 * | 12/2005 | Shin | .......................... | B60R 7/06 16/82 |

FOREIGN PATENT DOCUMENTS

| | | |
|---|---|---|
| CN | 203020211 U | 6/2013 |
| KR | 20080041452 A | 5/2008 |
| KR | 20120048164 A | 5/2012 |
| KR | 101614134 B1 | 4/2016 |

OTHER PUBLICATIONS

English Machine Translation of CN203020211U.
English Machine Translation of KR101614134B1.
English Machine Translation of KR20080041452A.
English Machine Translation of KR20120048164A.

* cited by examiner

*Primary Examiner* — Jason S Morrow

(57) ABSTRACT

A storage compartment for a vehicle glove box includes at least one bumper stop defined by a resilient tab disposed on a storage compartment sidewall, the resilient tab including a cam face, a stop face, and a finger tab accessible from an interior of the storage compartment. The cam face may define an arcuate configuration. The stop face is carried by the finger tab whereby a deflecting force applied to the finger tab deflects the stop face from a retaining position to a releasing position. The storage compartment sidewall defines an aperture disposed to provide access to the finger tab from an interior of the storage compartment. Vehicle glove boxes including the described storage compartment are provided.

20 Claims, 5 Drawing Sheets

GLOVE BOX BIN BUMPER STOPS

TECHNICAL FIELD

This document relates generally to bumper stops used to limit movement of a glove box in a vehicle.

BACKGROUND

Glove boxes are a common component of vehicles and are most often designed with a door that is contoured to mount flush with an instrument panel when the door is in a closed position. Behind the door is a storage compartment for holding personal items, for example, maps, flashlights, and vehicle manuals. Alternatively, in some designs a front wall of the storage compartment doubles as the door. Bumper stops (also called down stops) which limit displacement of the glove box when opened to a predetermined path of travel are known in the art and are typically positioned at least partially within the storage compartment. As the glove box door reaches an outer limit of a predetermined path of travel, the bumper stop contacts a detent or other structure, arresting further opening movement of the glove box door.

With reference to FIG. 1, currently bumper stops for glove boxes 100 comprising storage compartments 110 are provided by a stop piece comprising at least a shaft 112, which is passed through a glove box storage compartment sidewall 114 aperture 116 and secured in place by a friction or interference fit, a screw-threaded attachment, or other attachment type. Such bumper stops further often include a rubber or other polymer sleeve 118 placed over the shaft 112 to further secure the bumper stop in place and also to provide a quiet, rattle-free translation of the glove box as the sleeve contacts a detent 119. Disadvantageously, providing such sleeves 118 increases complexity and accordingly cost of manufacture, and further in use the sleeves may inadvertently dislodge from the shaft 112.

It is also desirable that bumper stops be configured for easy insertion and removal of the glove box during manufacturing or at any point in time, for maintenance or the like, if the need were to arise. Preferably, insertion and removal could be made without the need for tools or the removal of additional parts.

To solve this and other problems, this document relates to a storage compartment for a vehicle glove box, the storage compartment including bumper stops that are unitary and are accessible to a user via the storage compartment for removal thereof. Advantageously, this provides an efficient, effective glove box bumper stop allowing the entirety of the storage compartment to be used for storage by occupants of the vehicle. The described bumper stops are further advantageous in not requiring additional parts such as rubber or polymer sleeves, which further reduces manufacturing and other costs.

SUMMARY

In accordance with the purposes and benefits described herein, a storage compartment for a vehicle glove box is described, comprising at least one bumper stop defined by a resilient tab disposed on a storage compartment sidewall. The resilient tab comprises a cam face, a stop face, and a finger tab accessible from an interior of the storage compartment. The stop face is carried by the finger tab whereby a deflecting force applied to the finger tab deflects the stop face from a retaining position to a releasing position.

In embodiments, the cam face defines an arcuate configuration and the stop face defines an angled surface extending between the cam face and the finger tab. The storage compartment sidewall may define an aperture disposed to provide access to the finger tab from an interior of the storage compartment. In embodiments, the finger tab is disposed at a spaced distance from an interior surface of the cam face to define a cavity. In embodiments, resilient tabs defining bumper stops are disposed on opposed storage compartment sidewalls.

In another aspect, a glove box for a vehicle is provided, comprising a storage compartment displaceable between an open position and a closed position and at least one bumper stop as described above in a sidewall of the storage compartment. The at least one bumper stop may be defined by a resilient tab integrally formed in a storage compartment sidewall, the resilient tab comprising a cam face, a stop face, and a finger tab accessible from an interior of the storage compartment. In embodiments, resilient tabs defining bumper stops are disposed on opposed storage compartment sidewalls.

In the following description, there are shown and described several preferred embodiments of the described storage compartment for a glove box and associated bumper stops. As it should be realized, the device is capable of other, different embodiments and its several details are capable of modification in various, obvious aspects all without departing from the devices as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the storage compartment and bumper stops and together with the description serve to explain certain principles thereof. In the drawing figures.

Reference will now be made in detail to embodiments of the disclosed storage compartment and bumper stops, examples of which are illustrated in the accompanying drawing figures.

DETAILED DESCRIPTION

Figure 1:
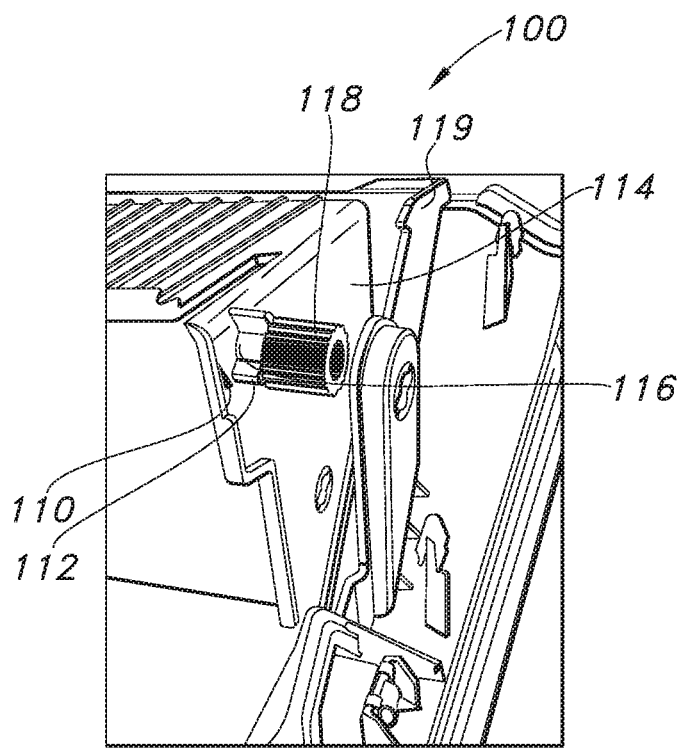
FIG. 1 shows a prior art glove box, a portion of an instrument panel-mounted receiver for the glove box, and a bumper stop.
Figure 2:
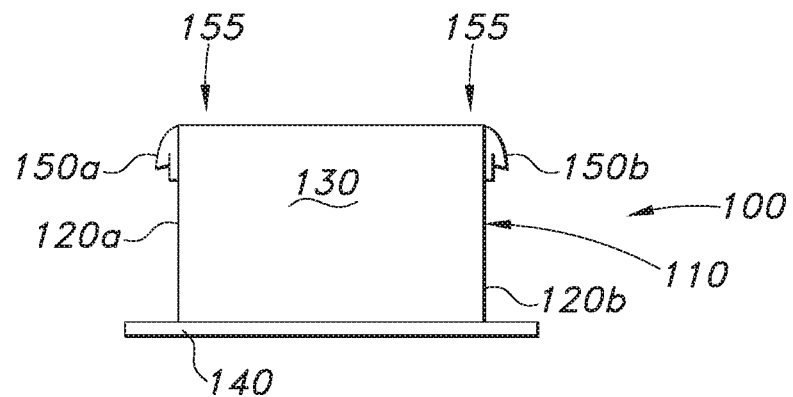
FIG. 2 is a top view of a glove box including a storage compartment having bumper stops according to the present disclosure.

Reference is now made to FIG. 2 which broadly illustrates an embodiment of a glove box 100 which, as is well known to the skilled artisan, is configured to be positioned within a receiver in a portion of a vehicle, for example in the dash panel. The glove box 100, in the embodiment shown, includes a storage compartment 110 defined by opposed sidewalls 120a, 120b and a floor 130. A door 140, which may include a locking or latching system (not shown) is disposed to hide any items held within the storage compartment 110 when the glove box 100 is placed in a closed orientation. It will be appreciated that other glove box 100 configurations are known, for example having a floor which also serves as a door. The presently described devices are equally applicable to such alternative glove box designs.

The storage compartment 110 is provided with external bumper stops 150a, 150b, the configuration and operation of which will be described in detail below. The bumper stops 150a, 150b are formed of a suitable resilient material, for example a resilient plastic, polymer, a metal, spring-actuated embodiments, etc. providing a suitable degree of flexibility to accomplish the functions described in greater detail below. As will be appreciated, the degree of flexibility of the bumper stops 150a, 150b may be tuned by, e.g., altering one or more of a thickness, a material, a geometry (height, width, or length) of portions of the bumper stops, thereby altering a stiffness of the bumper stops.

As shown, the bumper stops 150a, 150b are disposed on a vehicle-forward portion 155 portion of the storage compartment 110. The bumper stops 150a, 150b may be disposed on the storage compartment 110 by any suitable method. For example, the bumper stops 150a, 150b may include snap fit features for engaging cooperating retainers defined in the storage compartment sidewalls 120a, 120b (embodiment not shown). In other embodiments, the bumper stops 150a, 150b may be attached to the storage compartment sidewalls 120a, 120b by suitable fasteners, adhesives, and the like. In still other embodiments, the bumper stops 150a, 150b may be integral to the storage compartment sidewalls 120a, 120b, i.e. formed during the same molding or other fabrication process used to produce the storage compartment 110. As will be appreciated, this latter embodiment provides advantages of reduced components required and reduced tooling required for fabrication, with attendant benefits in ease of manufacture and assembly and consequently cost.

Figure 3:
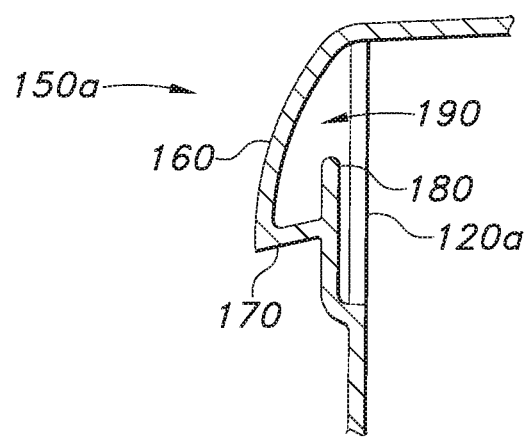
FIG. 3 is an isolated top view of a bumper stop as shown in FIG. 2, in a retaining position.

FIG. 3 shows an isolated view of a bumper stop 150a according to the present disclosure, associated with a storage compartment sidewall 120a and disposed at a front top corner of the storage compartment 110 (not shown in this view). As shown, the bumper stop 150a is a unitary construction comprising a cam face 160, a stop face 170, and a finger tab 180. As will be described, the finger tab 180 is accessible from an interior of the storage compartment 110 by an aperture 190 defined in the sidewall 120a.

Figure 4A:
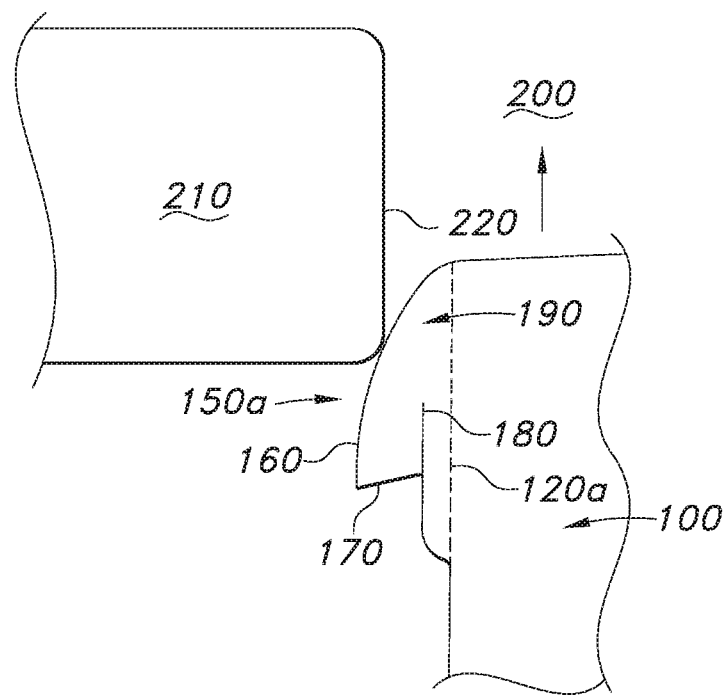
FIG. 4A shows a glove box storage compartment according to the present disclosure prior to insertion into a glove box receiver defined in a vehicle dash panel.
Figure 4B:
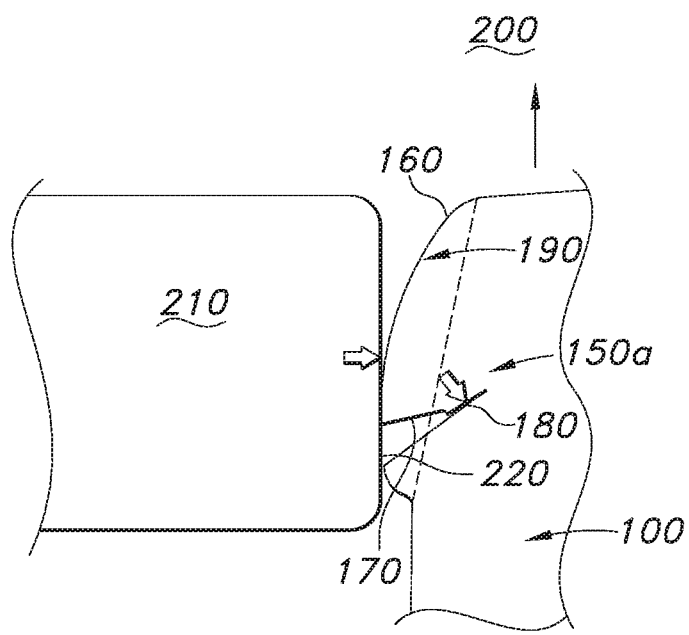
FIG. 4B shows the glove box storage compartment of FIG. 4A being inserted into the receiver.
Figure 4C:
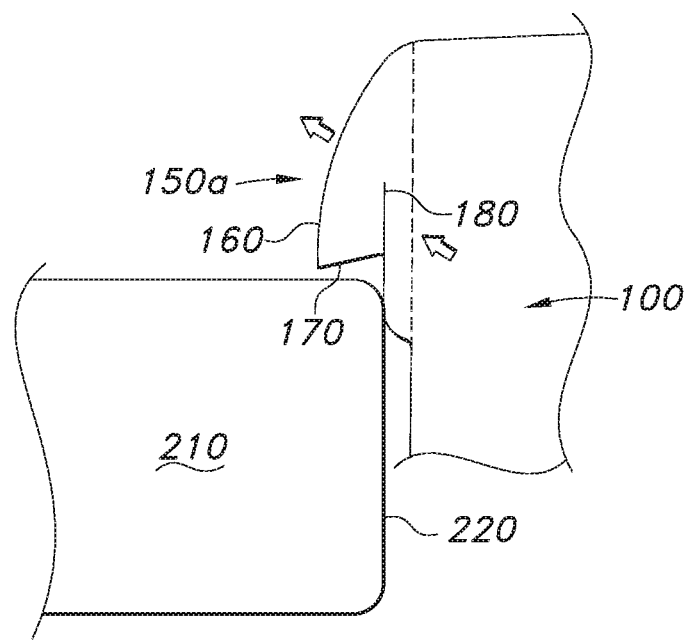
FIG. 4C shows the glove box storage compartment of FIG. 4A fully inserted into the receiver.

In the depicted embodiment, the cam face 160 defines an arcuate surface and the stop face 170 defines an angled surface extending between an end of the cam face 160 and a portion of the finger tab 180. As will be appreciated, an arcuate cam face 160 provides advantages in that, to install the storage compartment 110 in a cooperating receiver 200 such as in a vehicle dash panel 210, the installer need only slide the storage compartment vehicle-forwardly into the cooperating receiver (see FIGS. 4A-4C). Because the bumper stops 150a, 150b are flexible as described above, they are deflected storage compartment 110—inwardly by a lip 220 of the cooperating receiver aperture (FIG. 4B; see arrows). On clearing the receiver lip 220, the deflecting force imposed by the lip is removed and the bumper stops 150a, 150b deflect outwardly (FIG. 4C; see arrows).

It will be appreciated that the described arcuate cam face 160 and angled stop face 170 are but one possible embodiment. For example, an angled linear cam face 160 and substantially horizontal stop face 170 would provide similar functions. Accordingly, the above description will not be taken as limiting.

Figure 5:
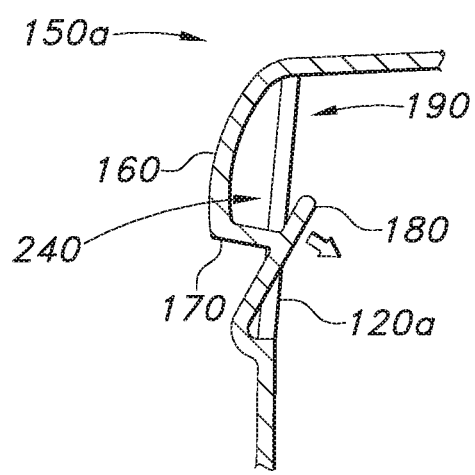
FIG. 5 is an isolated top view of the bumper stop of FIG. 3, in a releasing position.

Another feature of the disclosed bumper stops 150a, 150b will now be described. It is often necessary or desirable to remove a glove box 100 and associated storage compartment 110 for maintenance, replacement in the event of damage, servicing components located behind the storage compartment, etc. Desirably, such removal should be effected simply and with minimal or no tools. With reference to FIG. 5, as discussed above the bumper stops 150a, 150b are resilient features which may be deflected from/to their original configuration as described above. This feature becomes further advantageous when it is desired to remove the glove box 100 from the dash panel (or other vehicle structure) receiver 200. To do so, a user need only deflect the finger tabs 180 storage compartment-inwardly (see arrow). Advantageously, the described bumper stops 150a, 150b are configured such that the cam face 160 is held at a spaced distance from the finger tab 180, which distance is spanned by the stop face 170. This spaced distance provides a gap or cavity 240 sufficient for the user to insert a portion of a finger (not shown) to deflect the finger tab 180 storage compartment-inwardly. The glove box 100 can then be removed by substantially the reverse of the procedure described above in discussing FIGS. 4A-4C.

As will be appreciated from the discussion above, the presently described storage compartment 110 including bumper stops 150a, 150b presents numerous advantages over conventional bumper stops. Particularly in embodiments where the bumper stops 150a, 150b are provided as integral elements of the storage compartment 110, the reduced need for additional components, additional tooling, etc. reduce manufacturing complexity and cost. For example, by the present design the need for rubber or other polymer bumpers is obviated. Moreover, by the described design any mass increase attributable to the bumper stops 150a, 150b is minimized compared to conventional bumper stops.

By the described design, ease of assembly of a glove box 100 in vehicle structures such as dash panels is improved—the glove box and associated storage compartment 110 need only be snapped into the dash panel receiver 200 as described. Likewise, by the provision of a stop face 170 the risk of a bumper stop 150a, 150b inadvertently dislodging is minimized. The described bumper stops 150a, 150b are tunable, i.e., the degree of flexibility provided can be altered as needed by altering a thickness of the bumper stops, by adjusting a geometry of the stop face 170, etc.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A storage compartment for a vehicle glove box, comprising at least one bumper stop defined by a resilient tab disposed on a storage compartment sidewall, the resilient tab comprising a cam face, a stop face, and a finger tab accessible from an interior of the storage compartment, the finger tab being adapted for deflection to release the storage compartment.

2. The storage compartment of claim 1, wherein the cam face defines an arcuate configuration.

3. The storage compartment of claim 1, wherein the stop face is carried by the finger tab whereby a deflecting force applied to the finger tab deflects the stop face from a retaining position to a releasing position.

4. The storage compartment of claim 1, wherein the stop face defines an angled surface extending between the cam face and the finger tab.

5. The storage compartment of claim 1, wherein the storage compartment sidewall includes an aperture disposed to provide access to the finger tab from an interior of the storage compartment.

6. The storage compartment of claim 5, wherein the finger tab is disposed at a spaced distance from an interior surface of the cam face to define a cavity.

7. The storage compartment of claim 1, including a pair of resilient tabs defining bumper stops disposed on opposed storage compartment sidewalls.

8. A vehicle including the storage compartment of claim 1.

9. A glove box for a vehicle, comprising:
a storage compartment displaceable between an open position and a closed position; and
at least one bumper stop defined by a resilient tab integrally formed in a storage compartment sidewall, the resilient tab comprising a cam face, a stop face, and a finger tab accessible from an interior of the storage compartment, the finger tab being adapted for deflection to release the storage compartment.

10. The glove box of claim 9, wherein the cam face defines an arcuate configuration.

11. The glove box of claim 9, wherein the stop face is carried by the finger tab whereby a deflecting force applied to the finger tab deflects the stop face from a retaining position to a released position.

12. The glove box of claim 9, wherein the stop face defines an angled surface extending between the cam face and the finger tab.

13. The glove box of claim 9, wherein the storage compartment sidewall includes an aperture disposed to provide access to the finger tab from an interior of the storage compartment.

14. The glove box of claim 13, wherein the finger tab is disposed at a spaced distance from an interior surface of the cam face to define a cavity.

15. The glove box of claim 9, including a pair of resilient tabs defining bumper stops disposed on opposed storage compartment sidewalls.

16. A vehicle including the glove box of claim 9.

17. A glove box for a vehicle, comprising:
a storage compartment displaceable between an open position and a closed position, the storage compartment being defined by at least opposed sidewalls and a floor; and
a pair of bumper stops each defined by a resilient tab integrally formed in each opposed storage compartment sidewall, the resilient tab comprising an arcuate cam face, an angled stop face, and a finger tab accessible from an interior of the storage compartment;
the opposed sidewalls including an aperture disposed to provide access to the finger tab from an interior of the storage compartment, the finger tab being adapted for deflection to release the storage compartment.

18. The glove box of claim 17, wherein the angled stop face extends between the arcuate cam face and the finger tab.

19. The glove box of claim 17, wherein the finger tab is disposed at a spaced distance from an interior surface of the arcuate cam face to define a cavity.

20. A vehicle including the glove box of claim 17.

* * * * *